(12) United States Patent
Wacknov et al.

(10) Patent No.: US 12,438,391 B2
(45) Date of Patent: *Oct. 7, 2025

(54) INTERFACE SYSTEM FOR SUPPLYING AND/OR SINKING ENERGY

(71) Applicant: MAGICALL, Inc, Camarillo, CA (US)

(72) Inventors: Joel B Wacknov, Westlake Village, CA (US); Dinyu Qin, Oak Park, CA (US)

( * ) Notice: Subject to any disclaimer, the term of this patent is extended or adjusted under 35 U.S.C. 154(b) by 384 days.

This patent is subject to a terminal disclaimer.

(21) Appl. No.: 17/204,429

(22) Filed: Mar. 17, 2021

(65) Prior Publication Data
US 2021/0203243 A1 Jul. 1, 2021

Related U.S. Application Data

(63) Continuation of application No. 15/010,969, filed on Jan. 29, 2016, now Pat. No. 10,958,185.
(Continued)

(51) Int. Cl.
*H02J 13/00* (2006.01)
*G05B 19/042* (2006.01)
(Continued)

(52) U.S. Cl.
CPC ...... *H02J 13/00017* (2020.01); *G05B 19/042* (2013.01); *H02J 3/00* (2013.01);
(Continued)

(58) Field of Classification Search
CPC .......... H02J 13/00017; H02J 3/00; H02J 3/12; G05B 19/042; H02M 5/225; H02M 5/458; H02M 1/007
(Continued)

(56) References Cited

U.S. PATENT DOCUMENTS

2002/0001211 A1* 1/2002 Huggett .................. H02M 1/15
363/124
2002/0070557 A1 6/2002 Geis
(Continued)

OTHER PUBLICATIONS

Falcones et al. "Topology comparison for Solid State Transformer implementation," IEEE PES General Meeting, Minneapolis, MN, USA, 2010, pp. 1-8, doi: 10.1109/PES.2010.5590086. (Year: 2010).*
(Continued)

*Primary Examiner* — Mohammad Ali
*Assistant Examiner* — Joshua T Sanders
(74) *Attorney, Agent, or Firm* — DMK Intellectual Property Law PLLC

(57) ABSTRACT

The present disclosure relates to a system for sourcing and sinking power. The system may have a bi-directional system of electrical components configured for placement in electrical communication with a power source and a load. The bi- directional system may further be configured to source AC and DC power from the power source to the load and sink AC and DC power from the load to the power source. The system may further include a high frequency isolation transformer. In some embodiments, the system may have four input/output channels. The bi-directional system of electrical components may include a line filter configured to reduce harmonic content, a line converter configured for converting between AC power and DC power, a load converter configured for converting between AC power and DC power, and a load filter configured to reduce harmonic content.

19 Claims, 5 Drawing Sheets

Related U.S. Application Data

(60) Provisional application No. 62/109,143, filed on Jan. 29, 2015.

(51) Int. Cl.
*H02J 1/00* (2006.01)
*H02J 3/00* (2006.01)
*H02J 3/12* (2006.01)
*H02M 1/00* (2007.01)
*H02M 5/22* (2006.01)
*H02M 5/458* (2006.01)

(52) U.S. Cl.
CPC ............... *H02J 3/12* (2013.01); *H02M 5/225* (2013.01); *H02M 5/458* (2013.01); *G05B 2219/2639* (2013.01); *H02J 1/00* (2013.01); *H02M 1/007* (2021.05); *H02M 5/4585* (2013.01)

(58) Field of Classification Search
USPC .......................................................... 700/295
See application file for complete search history.

(56) References Cited

U.S. PATENT DOCUMENTS

| | | | |
|---|---|---|---|
| 2009/0073726 A1* | 3/2009 | Babcock | H02M 7/497 363/20 |
| 2012/0267953 A1* | 10/2012 | Doyle | H02M 1/44 307/31 |
| 2013/0234669 A1 | 9/2013 | Huang et al. | |

OTHER PUBLICATIONS

Zhao, Biao, Qiang Song, and Wenhua Liu. "A practical solution of high-frequency-link bidirectional solid-state transformer based on advanced components in hybrid microgrid." IEEE Transactions on Industrial Electronics 62.7 (2014): 4587-4597 (Year: 2014).*

Aboadla et al., Selective Harmonics Elimination technique in single phase unipolar H-bridge inverter. 1-4. 10.1109/SCORED.2016. 7810057. (2016). (Year: 2016).*

Falcones, Sixifo et al "Topology Comparison for Solid State Transformer Implementation". 2010 IEEE Power and Energy Society General Meeting , Jul. 25-20, 2010 (pp. 1-8).

International Search Report & Written Opinion for PCT Application PCT/US2016/015742, May 4, 2016 (16 pages).

* cited by examiner

INTERFACE SYSTEM FOR SUPPLYING AND/OR SINKING ENERGY

CROSS-REFERENCE TO RELATED APPLICATIONS

This application is a continuation application of U.S. Ser. No. 15/010,969 filed Jan. 29, 2016 and entitled INTERFACE SYSTEM FOR SUPPLYING AND/OR SINKING ENERGY which claims the benefit of U.S. provisional patent application Ser. No. 62/109,143, filed on Jan. 29, 2015, entitled "Interface System for Supplying and/or Sinking Energy" the disclosures of which are hereby incorporated by reference herein in their entirety.

FIELD OF THE INVENTION

The present application is generally directed to energy sourcing and sinking. Particularly, the present application relates to systems and methods for sourcing and/or sinking energy between a power source and a load.

BACKGROUND OF THE INVENTION

The background description provided herein 1 s for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Various industrial and other applications call for power sourcing and/or power sinking capabilities. Power sourcing may transfer energy from a power source, such as a grid or other power source, to a load, such as a battery for example. Conversely, power sinking may transfer energy form a load to a power source. Various industrial and other applications call for a power supply or source capable of delivering regulated AC and/or DC power to a load. Additionally, in some applications, such as testing applications, there is a need for systems and methods of absorbing, or "sinking" AC and/or DC power from a load. For example, to test a generator or power supply, a load may be used to sink power from the power supply. Power sinking may also be used for returning power to a utility grid. For example, in the field of solar power, energy from solar cells may be put onto the grid with an inverter. Some conventional power sinking devices or systems operate with a resistive load, which may be inefficient by losing energy in the form of heat, for example. In some applications, there is the need to alternately both source and sink power. For example, in the field of energy storage, a battery load may be charged from a power source, and alternatively discharged back to the power source.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

The present disclosure, in one or more embodiments, relates to a system for sourcing and sinking power, the system including a bi-directional system of electrical components configured for placement in electrical communication with a power source and a load. The bi-directional system of electrical components may further be configured to source AC and DC power from the power source to the load and to sink AC and DC power from the load to the power source. In some embodiments, the bi-directional system of electrical components may include a high frequency isolation transformer, a line isolation converter directly connected to the isolation transformer and configured for converting power to and from high frequency AC power, and a load isolation converter directly connected to the isolation transformer and configured for converting power to and from high frequency AC power. In some embodiments, the line isolation converter and load isolation converter may each have one or more transistors in direct electrical communication with a DC bus having a bulk capacitor. The line isolation converter and load isolation converter may each include an H Bridge. In some embodiments, the bi-directional system of electrical components may include a line filter configured for electrical connection to the power supply and further configured to reduce harmonic content, a line converter in electrical communication with the line filter and configured for converting between AC power and DC power, a load converter in electrical communication with the line converter and configured for converting between AC power and DC power, and a load filter in electrical communication with the load converter and configured for electrical connection to the load and further configured to reduce harmonic content. The line filter and load filter may each have an inductor-capacitor-inductor configuration. The line converter and load converter may each include one or more transistors in direct electrical communication with a DC bus having a bulk capacitor. In some embodiments, the system may have four input/output channels. The system may also have a communication and control module in some embodiments. The communication and control module may be in communication with the bi-directional system of electrical components and may be configured to activate, deactivate, adjust, or otherwise control the bi-directional system of electrical components. In some embodiments, the communication and control module may include a microprocessor providing processing power to the communication and control module, internal communication components in direct electrical communication with the bi-directional system of electrical components, a user interface for monitoring and controlling the bi-directional system of electrical components, and a power supply providing power to the microprocessor, internal communication components, and user interface. The communication and control module may further include external communication components in communication with an external automation system. In some embodiments, the communication and control module may a WI-FI connection, Bluetooth connection, Ethernet connection, USB connection, and/or RS485 connection.

The present disclosure, in one or more embodiments, further relates to a system for sourcing and sinking power, the system including a bi-directional system of electrical components. The bi-directional system may have a high frequency isolation transformer, a line isolation converter directly connected to the isolation transformer and configured for converting power to and from high frequency AC power, and a load isolation converter directly connected to the isolation transformer and configured for converting power to and from high frequency AC power. The bi-directional system of electrical components may be configured for placement in electrical communication with a power source and a load, and may further be configured to source power from the power source to the load and to sink power from the load to the power source. In some embodiments, the bi-directional system of electrical components may include a line filter configured for electrical connection to the power supply and further configured to reduce harmonic content, a line converter in electrical communication with the line filter and configured for converting between AC power and DC power, a load converter in electrical communication with the line converter and configured for converting between Ac power and DC power, and a load filter in electrical communication with the load converter and configured for electrical connection to the load and further configured to reduce harmonic content. The line filter and load filter may each have an inductor-capacitor-inductor configuration. The line converter and load converter may each have one or more transistors in direct electrical communication with a DC bus having a bulk capacitor. In some embodiments, the bi-directional system of electrical components may include a line isolation converter and a load isolation converter, each directly connected to the isolation transformer and each configured for converting power to and from high frequency AC power. The line isolation converter and load isolation converter may each have one or more transistors in direct electrical communication with a DC bus having a bulk capacitor. The line isolation converter and load isolation converter may each include an H bridge. In some embodiments, the system may additionally have four input/output channels. The system may further have a communication and control module in communication with the bi-directional system of electrical components and configured to activate, deactivate, adjust, or otherwise control the bi-directional system of electrical components.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure relates to systems and methods for power sourcing and/or sinking. A power supplying and/or sinking system of the present disclosure may be configured between a power source and a load. The system may supply power, for example, by transferring energy from the power source to the load. Additionally or alternatively, the system may sink power, for example by transferring energy from the load to the power source. That is, in some embodiments, each component of the system may be capable of bi-directional operation and the system may be operated bi-directionally to both source and sink power. In sinking and/or sourcing applications, the system may be particularly efficient with little to no energy loss. The systems and methods of the present disclosure may be used in a variety of applications. For example, the systems and methods may be used with various power sources and loads, each of which may be configured for AC and/or DC power. Moreover, particular embodiments of the disclosure may include a high frequency transformer allowing for a reduced size and weight of the transformer and, thus, the overall system.

Figure 1:
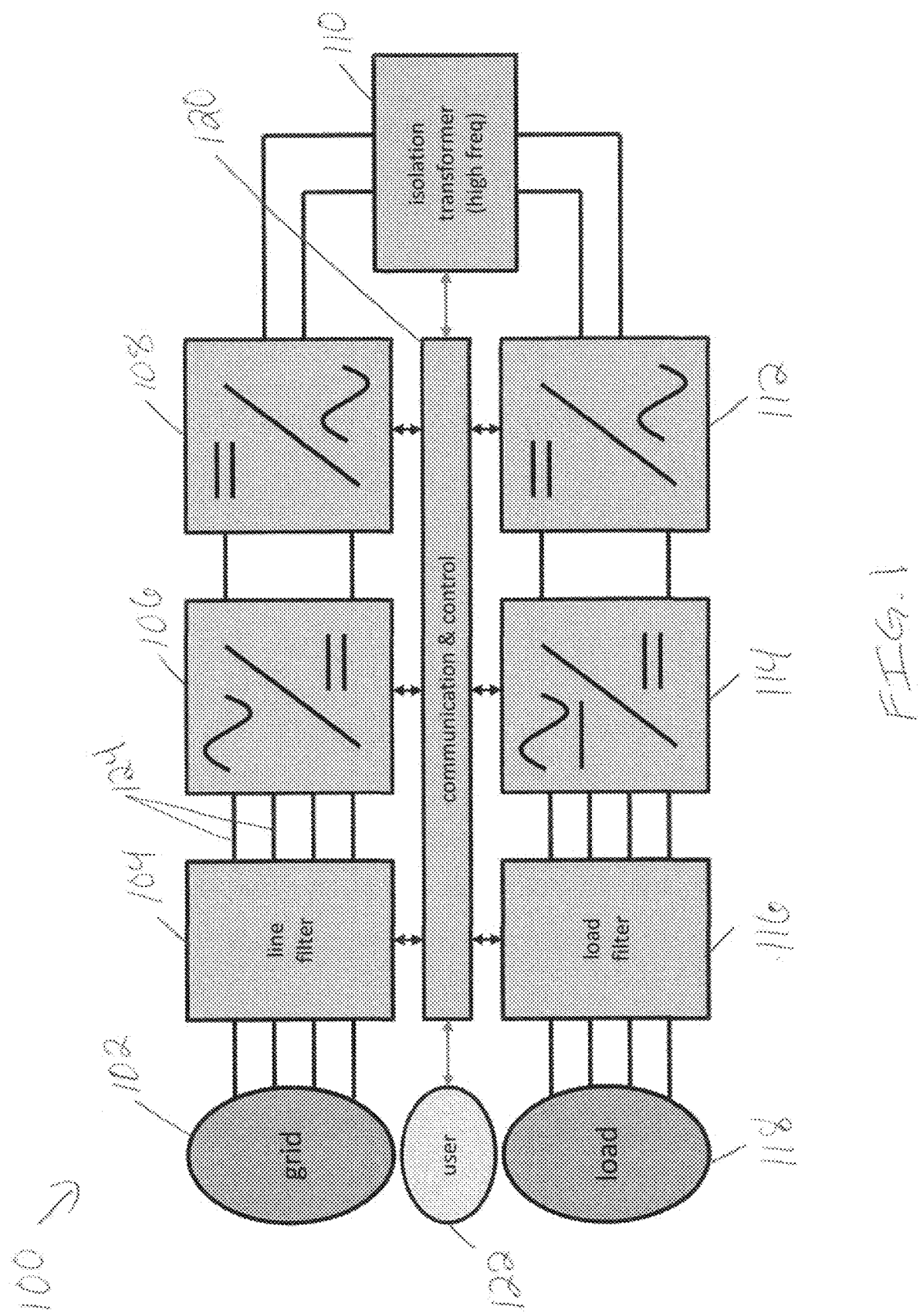
FIG. 1 is a conceptual diagram of a power sourcing and/or sinking system, according to one or more embodiments.

A system 100 of the present disclosure is shown in FIG. 1. As shown, the system 100 may include a grid 102, a line filter 104, a line converter 106, a line isolation converter 108, a transformer 110, a load isolation converter 112, a load converter 114, a load filter 116, a load 118, a communication and control module 120, and a user 122. It may be appreciated that the system 100 may have more or fewer components in some embodiments. For example, in some embodiments, the system 100 may operate as a non-isolation system without the line isolation converter 108, the transformer 110 and the load isolation converter 112. In other embodiments, the system 100 may have different configurations and/or components.

The grid 102 may generally be any suitable power source and may be configured for supplying power and/or absorbing power. The grid 102 may have a single phase or three phase AC connection with a frequency of between 50 and 60 Hz, for example. In other embodiments, the grid 102 may have an AC connection with any suitable frequency. In some embodiments, the grid 102 may have a DC connection. For example, the grid 102 may be or include a battery or other DC source. In some embodiments, the system 100 may pull energy from the grid 102. The system 100 may additionally regenerate back to the grid 102 using industry standard protocols and requirements, such as for example UL1741 or other standards. In this way, it may be appreciated that the grid 102 may be bi-directional and may absorb energy from the system 100.

Figure 2:
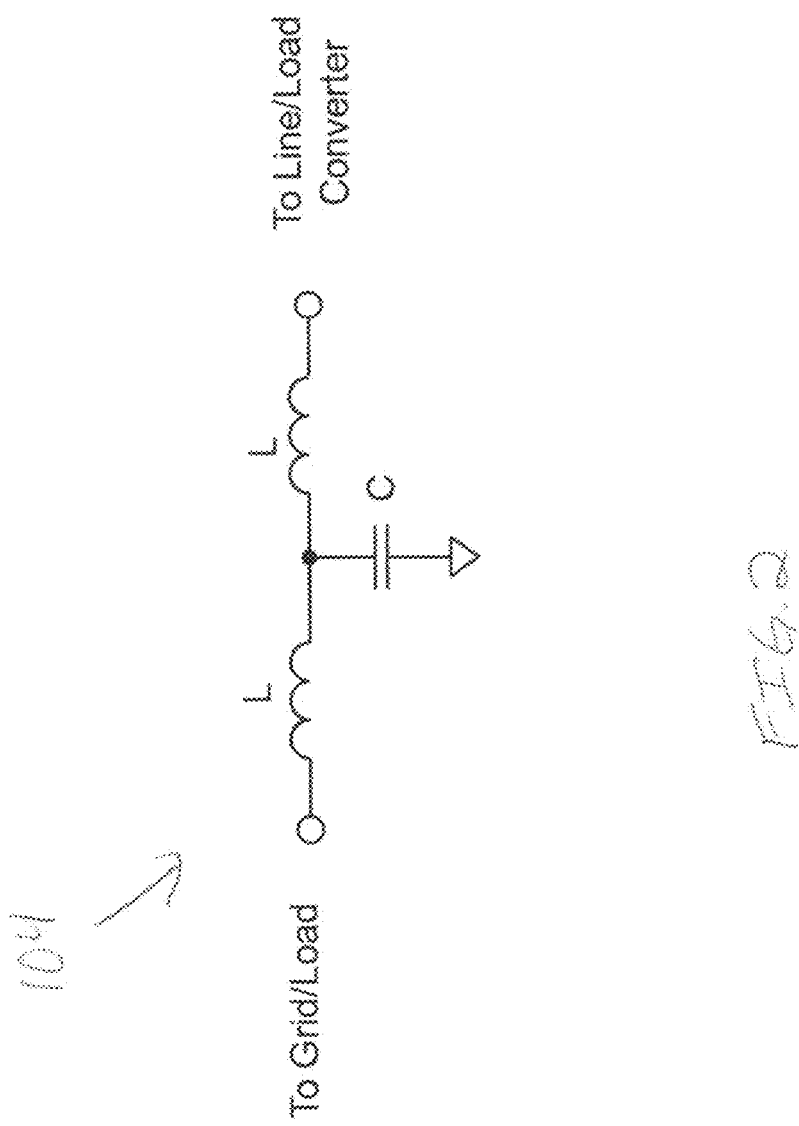
FIG. 2 is an electrical schematic diagram of a filter, according to one or more embodiments.

The line filter 104 may be positioned between the grid 102 and the line converter 106. In other embodiments, the line filter 104 may be positioned differently within the system 100. In some embodiments, the line converter 104 may be configured to filter power received from the grid 102 before sending the power to the line converter 106. Additionally or alternatively, the line converter 104 may be configured for reducing harmonic content produced by the line converter 106. For example, the line filter 104 may filter signals from the line converter 106 to comply with grid power quality standards, industry protocols or requirements, or other standards. In this way, it may be appreciated that the line filter 104 may be bi-directional such that power may flow in either direction across or through the filter. As shown in FIG. 2, the line filter 104 may comprise an inductor-capacitor-inductor (L-C-L) type filter. The line filter 104 may have more than one L-C-L filter in some embodiments. For example, in some embodiments, the line filter 104 may have four L-C-L filters configured to accommodate four phases. In some embodiments, one or more of the inductors of the line filter 104 may be an enclosed multiple-gap core inductor, as described in U.S. Non-provisional patent application Ser. No. 14/697,164, filed Apr. 27, 2015, and incorporated herein by reference.

Figure 3:
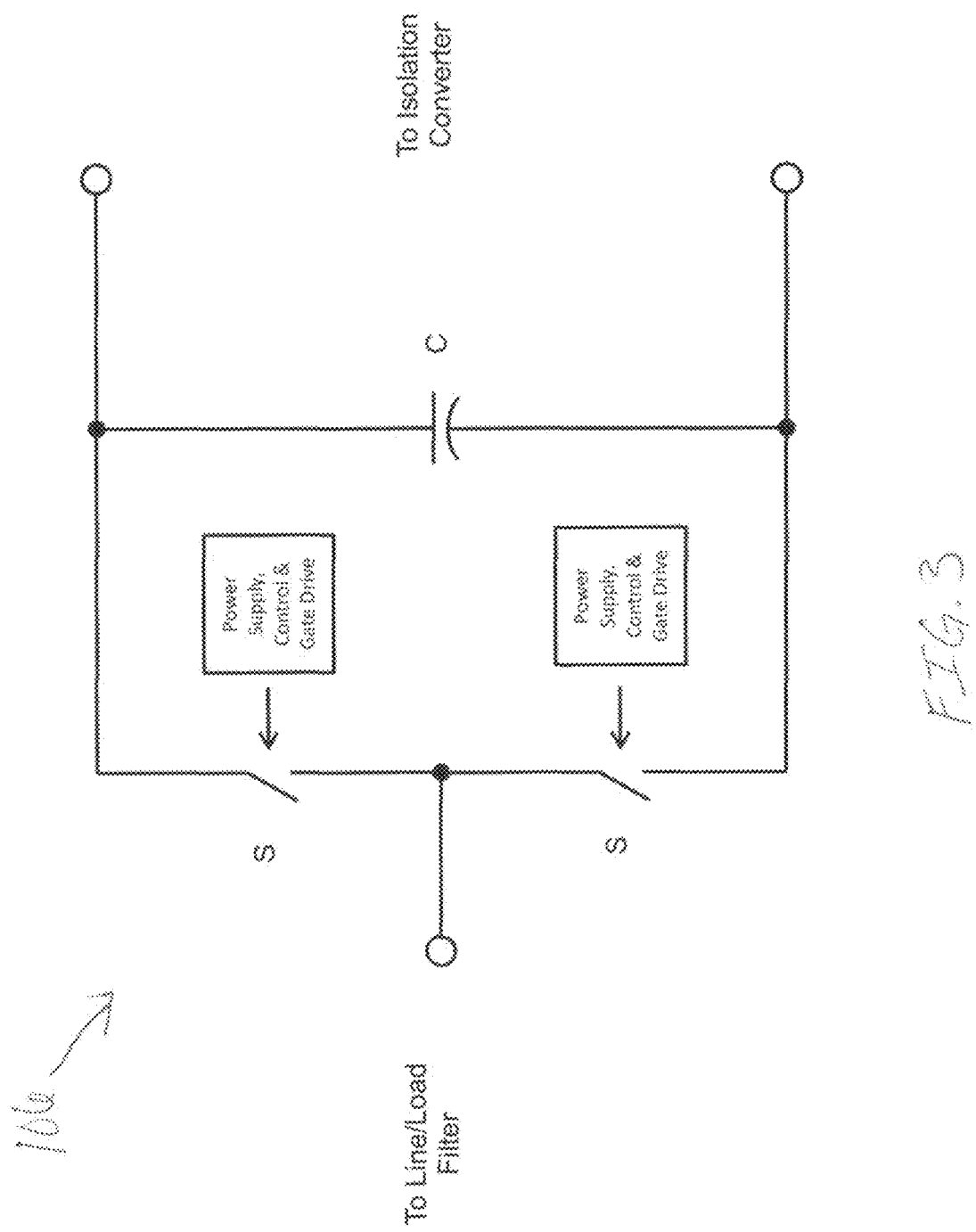
FIG. 3. is an electrical schematic diagram of a converter, according to one or more embodiments.

The line converter 106 may be positioned between the line filter 104 and the line isolation converter 108. In other embodiments, the line converter 106 may be positioned differently within the system 100. The line converter 106 may be configured for converting between AC and DC power. For example, the line converter 106 may convert AC power from the grid 102 into DC power. Or for example, where the grid 102 provides DC power, the line converter 102 may convert DC power from the grid to AC power. Additionally or alternatively, the line converter 106 may convert DC power from the isolation converter 108 into AC power for use with the grid 102. In this way, it may be appreciated that the line converter 106 may be bi-directional such that power may flow in either direction across or through the converter. As shown in FIG. 3, the line converter 106 may comprise one or more transistors (S) and a DC bus with a bulk capacitor (C). The one or more power transistors (S) may be metal oxide semiconductor field effect transistors MOSFET, insulated gate bipolar transistors IGBT, or a different transistor type. The line converter 106 may further comprise a power supply, controls, and/or a gate driver for the power transistors. It may be appreciated that while a single phase line converter 106 is shown in FIG. 3, the system 100 may comprise more than one phase. For example, the line converter 106 may accommodate four phases in some embodiments.

Figure 4:
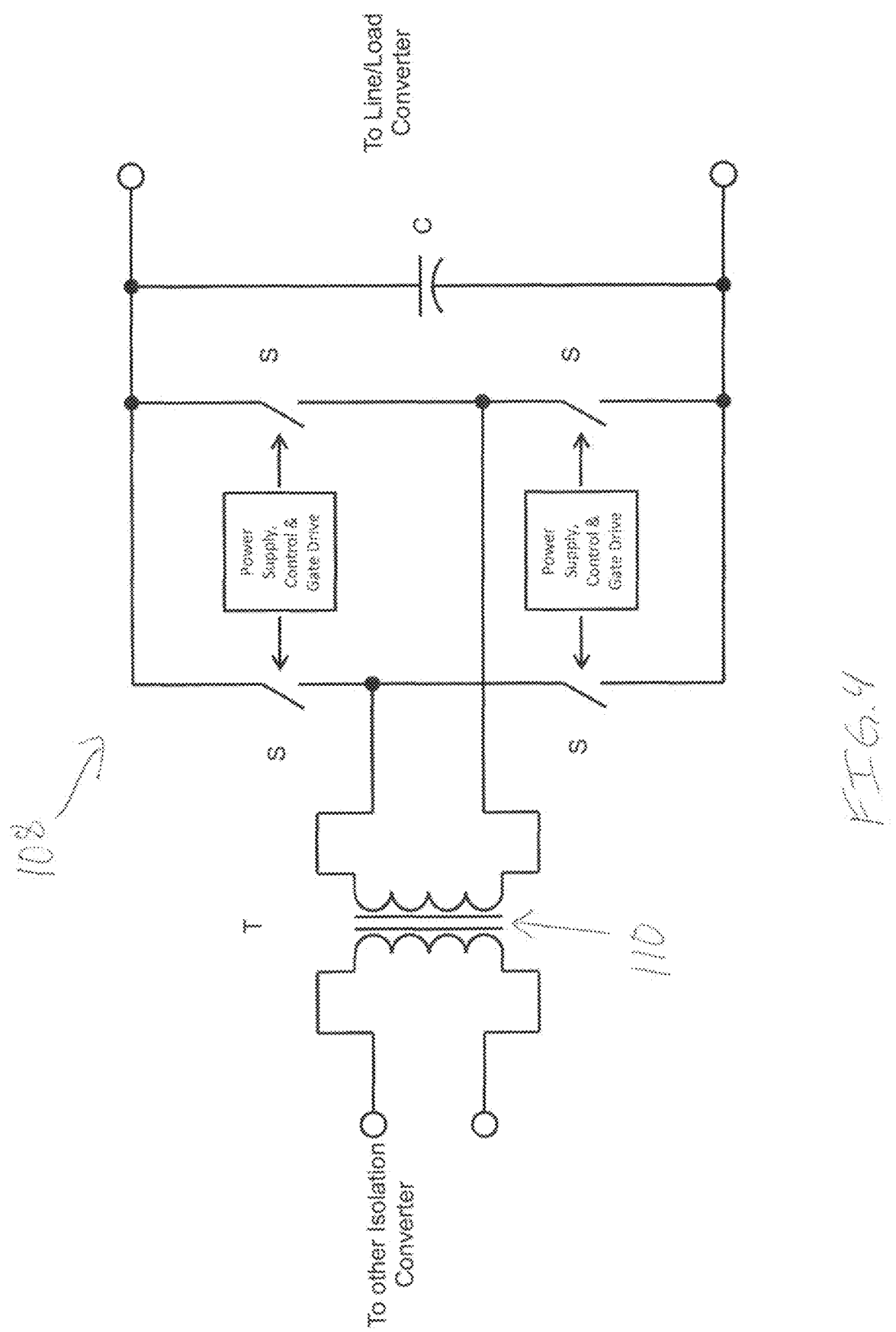
FIG. 4. is an electrical schematic diagram of an isolation converter, according to one or more embodiments.

The line isolation converter 108 may be positioned between the line converter 106 and the isolation transformer 110. In other embodiments, the line isolation converter 108 may be positioned differently within the system 100. The line isolation converter 108 may be configured to convert DC power to AC power. For example, the line isolation converter 108 may receive DC power from the line converter 106 and convert it to high frequency AC power to power the transformer 110. High frequency AC power may be AC power of up to, for example, 100 kHz. In other embodiments, high frequency AC power may have any suitable frequency. Additionally or alternatively, the line isolation converter 108 may convert AC power, such as high frequency AC power, to DC power. For example, the line isolation converter 108 may receive AC power, such as high frequency AC power, from the transformer 110 and convert it to DC power to feed the line converter 106. In this way, it may be appreciated that the line isolation converter 108 may be bi-directional such that power may flow in either direction across or through the isolation converter. As shown in FIG. 4, the line isolation converter 108 may comprise one or more power transistors (S) and a DC bus with a bulk capacitor (C). The line isolation converter 108 may further comprise a power supply, controls and/or a gate driver for the power transistors. While two phases (formulating an "H bridge") are shown in FIG. 4, the line isolation converter 108 may be configured for more or fewer phases. The line isolation converter 108 is shown in communication with the transformer 110.

The transformer 110 may be positioned between the line isolation converter 108 and the load isolation converter 112. In other embodiments, the transformer 110 may be positioned differently within the system 100. The transformer 110 may be configured to convert power from a first voltage to a second voltage. The transformer 110 may be configured to operate bi-directionally, such that power may flow in either direction across or through the transformer. That is, the transformer 110 may convert power received from the line isolation converter 108 or from the load isolation converter 112, for example. The transformer 110 may be an isolation transformer in some embodiments, which may allow the load 118 to be galvanically isolated. Isolation may allow the system 100 to be used in a variety of applications. Additionally, in some embodiments, the transformer 110 may operate at a relatively high frequency, such as up to 100 kHz for example. A high frequency transformer 110 may be relatively small and compact as compared to other transformers allowing this component of the system to be relatively small. The smaller transformer 110 may, thus, contribute to allowing for system 100 that is relatively lightweight and small in size, as compared with a system having a transformer operating at a lower frequency.

The load isolation converter 112 may be positioned between the transformer 110 and load converter 114. In other embodiments, the load isolation converter 112 may be positioned differently within the system 100. The load isolation converter 112 may be configured to convert AC power to DC power. For example, the load isolation converter 112 may receive AC power, such as high frequency AC power, from the transformer 110 and convert it to DC power to feed the load converter 114. Additionally or alternatively, the load isolation converter 112 may convert DC power to AC power, such as high frequency AC power. For example, the load isolation converter 112 may receive DC power from the load converter 114 and convert it to AC power, such as high frequency AC power, to power the transformer 110. In this way, it may be appreciated that the load isolation converter 112 may be bi-directional such that power may flow in either direction across or through the isolation converter. In some embodiments, the load isolation converter 112 may be similar to the line isolation converter 108 and may have one or more of the components shown in FIG. 4, for example. In other embodiments, the load isolation converter 112 may have additional or alternative components.

The load converter 114 may be positioned between the load isolation converter 112 and the load filter 116. In other embodiments, the load converter 114 may be positioned differently within the system 100. The load converter 114 may be configured for converting between AC and DC power. For example, the load converter 114 may convert DC power received from the load isolation converter 112 into AC power. Additionally or alternatively, the load converter 114 may convert DC power from the isolation converter 112 into AC power for use with the load 118. In this way, it may be appreciated that the load converter 114 may be bi-directional such that power may flow in either direction across or through the converter. In some embodiments, the load converter 114 may be similar to the line converter 106 and may have one or more of the components shown in FIG. 3, for example. In other embodiments, the load converter 114 may have additional or alternative components.

The load filter 116 may be positioned between the load isolation converter 116 and the load 118. In other embodiments, the load filter 116 may be positioned differently within the system 100. In some embodiments, the load converter 116 may be configured for reducing harmonic content produced by the load converter 114. For example, the load filter 116 may regulate signals from the load converter 114 for use with the load 118. Additionally or alternatively, the load filter 116 may filter signals received from the load 118 before sending them to the load converter 114. In this way, it may be appreciated that the load filter 116 may be bi-directional such that power may flow in either direction across or through the filter. In some embodiments, the load filter 116 may be similar to the line filter 104 and may have one or more of the components shown in FIG. 2, for example. In other embodiments, the load filter 116 may have additional or alternative components. In some embodiments, one or more of the inductors of the load filter 116 may be an enclosed multiple-gap core inductor, as described in U.S. Non-provisional patent application Ser. No. 14/697,164, previously incorporated by reference.

The load 118 may operate on AC and/or DC power and may be configured for absorbing power from the grid 102 and/or sinking power to the grid. In this way, it may be appreciated that the load 118 may be bi-directional. The load may be generally any electrical component, such as but not limited to a battery, resistor, power supply, motor, generator, or other suitable component.

Figure 5:
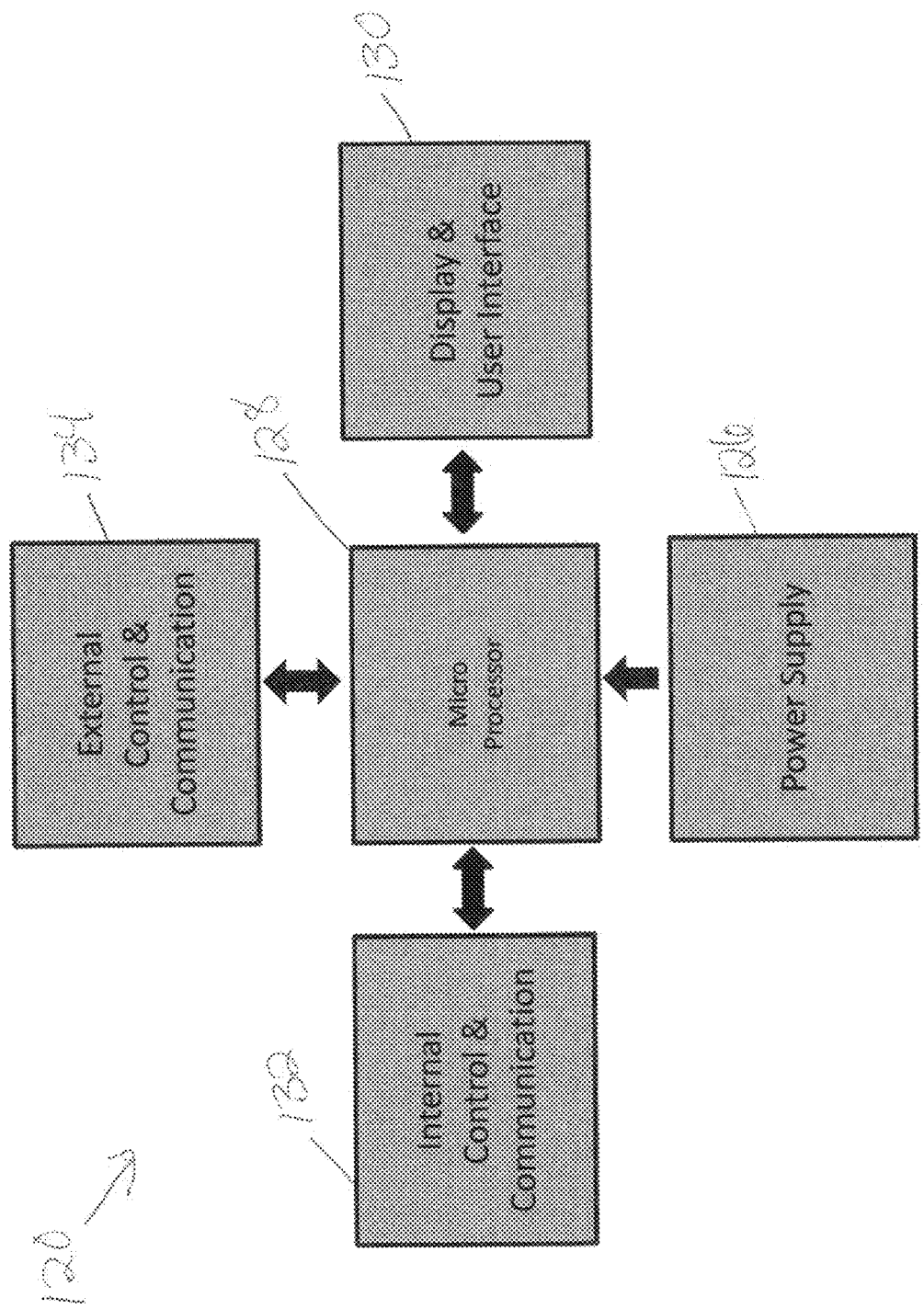
FIG. 5. is a conceptual diagram of a communication and control module, according to one or more embodiments.

The communication and control module 120 may be configured for controlling and/or measuring the other components of the system 100. The communication and control module 120 may further provide an interface for the user 122 to interact with the system 100. It may be appreciated that the communication and control module 120 may comprise multiple modules or boards in some embodiments. One example of the communication and control module 120 is shown in FIG. 5. As shown, the communication and control module 120 may have a power supply 126, a microprocessor 128, a display panel and user interface 130, internal control and communication 132, and external control and communication 134

The power supply 126 may provide power to the communication and control module 120. The power supply 126 may be independent of the grid 102. The power supply 126 may be an AC or DC power source. In some embodiments, the power supply may be a battery source, for example. In other embodiments, the power supply 126 may be or include any suitable power source.

The microprocessor 128 may provide processing and computing power for the communication and control module 120. The microprocessor 128 may be configured to perform a variety of functions related to monitoring and/or controlling the system 100. The microprocessor 128 may be any suitable microprocessor device. In some embodiments, the microprocessor 128 may comprise multiple microprocessors.

The display panel and user interface 130 may provide an interface for a user 122 to interact with the system 100. The display panel and user interface 130 may provide controls for monitoring and/or controlling components of the system 100. The display panel and user interface 130 may provide a display, such as a digital display, showing monitored statistics or functions of the system 100. The display panel and user interface 130 may have a touch screen interface in some embodiments. Additionally or alternatively, the display panel and user interface 130 may have any number of buttons, lights, or screens. The display panel and user interface 130 may be configured to operate with a personal computer, tablet, mobile device, or other device or computer.

The internal control and communication 132 may connect to various internal components of the system, such as for example, the filters, converters, and isolation converters. The internal control and communication 132 may provide a connection between components of the system 100 such as filters, converters, and isolation converters and the microprocessor 128 and/or display panel and user interface 130. The internal control and communication 132 may include various wires or other connectors.

The external control and communication 134 may connect the system 100 to an external entity or device such as a factory automation system or other entity or device. In some embodiments, the external control and communication 134 may allow for external or remote control of the system 100. The external control and communication 134 may include various wires or other connectors. In some embodiments, the system 100 may include a communication device or interface such as Ethernet, Wi-Fi, Bluetooth USB, RS485, and/or other standard industrial communication standards.

Referring back to FIG. 1, the user 122 may be an individual, device, or entity located locally or remotely from the system. The user 122 may interact with the system 100 via the communication and control module 120. The user 122 may operate, control, and/or monitor functionality of the system 100.

The system 100 may have any suitable number of input and/or output channels 124. For example, the system 100 may have four input and/or output channels 124, as shown in FIG. 1. Each input and/or output channel 124 may operate independently or may be synchronized with one or more other channels. The multiple input and/or output channels 124 may allow the system 100 to be used in a variety of applications, including but not limited to: three phase, four wire AC source/sink; Three phase, three wire AC source/sink with one independent bi-directional DC channel; Single phase AC source/sink with two independent bi-directional DC channels; four independent bi-directional DC channels; two independent bi-directional DC channels with twice the current capability; and one bi-directional DC channel with four times the current capability. In some embodiments, the system 100 may automatically detect a connection, such as a single phase AC or three phase AC connection, and adjust accordingly.

It may be appreciated that the system 100, including each element within the system, may be bi-directional, such that power or energy may flow in either direction between the grid 102 and the load 118. In this way, the system 100 may source power from the grid 102 to the load 118, and may sink power from the load back to the grid. Thus, the system 100 may treat either the grid 102 or the load 118 as a source of power, depending on which way the energy is flowing through the bi-directional system.

For example, in one particular application, the system 100 may be used to test a three phase power supply. Using three channels 224 in AC mode the system 100 may provide power from the grid to the supply, and using the fourth channel in DC mode it may load the supply. The system 100 may provide measurements of the input power, output power, and efficiency of the supply being tested. In some embodiments, the power used to test the supply may be "cycled" back to the grid. In this way, the system 100 may be efficient by effectively borrowing power from the grid 102 to test the power supply.

The systems and methods described herein may be configured for both sourcing and sinking power. That is, for example, system 100 may be configured to operate bi-directionally to source power when operated in one direction, and additionally to sink power when operated in an opposing direction. The systems and methods may provide for efficient power transfers with relatively little to no energy loss in sourcing and sinking applications. Moreover, high frequency isolation may allow the systems described to operate using relatively compact and lightweight components, as compared with more traditional sourcing or sinking equipment. Moreover, the systems described may be used in a wide variety of sourcing and sinking applications. In particular, the ability of the system to both source and sink power between an AC and/or DC power source and an AC and/or DC load provides a particular level of use versatility unknown in the art. The systems described herein may function as a stand-alone piece of equipment in some embodiments, or may be integrated into a large scale process control or industrial application, for example, in other embodiments.

For purposes of this disclosure, any system described herein, and m particular, the control module (10) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, a system or any portion thereof may be a personal computer (e.g., desktop or laptop), tablet computer, mobile device (e.g., personal digital assistant (PDA) or smart phone), server (e.g., blade server or rack server), a network storage device, or any other suitable device or combination of devices and may vary in size, shape, performance, functionality, and price. A system may include random access memory (RAM), one or more processing resources such as a central processing unit (CPU) or hardware or software control logic, ROM, and/or other types of nonvolatile memory. Additional components of a system may include one or more disk drives or one or more mass storage devices, one or more network ports for communicating with external devices as well as various input and output (I/O) devices, such as a keyboard, a mouse, touchscreen and/or a video display. Mass storage devices may include, but are not limited to, a hard disk drive, floppy disk drive, CD-ROM drive, smart drive, flash drive, or other types of non-volatile data storage, a plurality of storage devices, or any combination of storage devices. A system may include what is referred to as a user interface, which may generally include a display, mouse or other cursor control device, keyboard, button, touchpad, touch screen, microphone, camera, video recorder, speaker, LED, light, joystick, switch, buzzer, bell, and/or other user input/output device for communicating with one or more users or for entering information into the system. Output devices may include any type of device for presenting information to a user, including but not limited to, a computer monitor, flat-screen display, or other visual display, a printer, and/or speakers or any other device for providing information in audio form, such as a telephone, a plurality of output devices, or any combination of output devices. A system may also include one or more buses operable to transmit communications between the various hardware components.

One or more programs or applications, such as a web browser, and/or other applications may be stored in one or more of the system data storage devices. Programs or applications may be loaded in part or in whole into a main memory or processor during execution by the processor. One or more processors may execute applications or programs to run systems or methods of the present disclosure, or portions thereof, stored as executable programs or program code in the memory, or received from the Internet or other network. Any commercial or freeware web browser or other application capable of retrieving content from a network and displaying pages or screens may be used. In some embodiments, a customized application may be used to access, display, and update information.

Hardware and software components of the present disclosure, as discussed herein, may be integral portions of a single computer or server or may be connected parts of a computer network. The hardware and software components may be located within a single location or, in other embodiments, portions of the hardware and software components may be divided among a plurality of locations and connected directly or through a global computer information network, such as the Internet.

As will be appreciated by one of skill in the art, the various embodiments of the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, middleware, microcode, hardware description languages, etc.), or an embodiment combining software and hardware aspects. Furthermore, embodiments of the present disclosure may take the form of a computer program product on a computer-readable medium or computer-readable storage medium, having computer-executable program code embodied in the medium, that define processes or methods described herein. A processor or processors may perform the necessary tasks defined by the computer-executable program code. Computer-executable program code for carrying out operations of embodiments of the present disclosure may be written in an object oriented, scripted or unscripted programming language such as Java, Perl, PHP, Visual Basic, Smalltalk, C++, or the like. However, the computer program code for carrying out operations of embodiments of the present disclosure may also be written in conventional procedural programming languages, such as the C programming language or similar programming languages. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the context of this document, a computer readable medium may be any medium that can contain, store, communicate, or transport the program for use by or in connection with the systems disclosed herein. The computer-executable program code may be transmitted using any appropriate medium, including but not limited to the Internet, optical fiber cable, radio frequency (RF) signals or other wireless signals, or other mediums. The computer readable medium may be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

Various embodiments of the present disclosure may be described herein with reference to flowchai1 illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks. Alternatively, computer program implemented steps or acts may be combined with operator or human implemented steps or acts in order to carry out an embodiment of the invention.

Additionally, although a flowchart may illustrate a method as a sequential process, many of the operations in the flowcharts illustrated herein can be performed in parallel or concurrently. In addition, the order of the method steps illustrated in a flowchart may be rearranged for some embodiments. Similarly, a method illustrated in a flow chart could have additional steps not included therein or fewer steps than those shown. A method step may correspond to a method, a function, a procedure, a subroutine, a subprogram, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an ingredient or element may still actually contain such item as long as there is generally no measurable effect thereof.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

We claim:

1. An assembly comprising:
    a power interface between a first power device and a second power device, said power interface operable to supply power from the first power device to the second power device in a first direction and supply power from the second power device to the first power device in a second direction, said power interface including a first power converter coupled to the first power device and a second power converter coupled to the second power device and the first power converter including one or more controllable gates operable to convert AC and DC power from the first power device to supply AC/DC power to the second power device in the first direction and the second power converter including one or more controllable gates operable to convert AC and DC power from the second power device to supply AC/DC power to the first power device in the second direction; and
    a control module coupled to the one or more controllable gates to operate the first and second power converters to supply AC/DC power from the first power device to the second power device in the first direction and supply AC/DC power from the second power device to the first power device in the second direction.

2. The assembly of claim 1, wherein the power interface comprises:
    a high frequency isolation transformer between the first and second power converters and including;
    a first isolation converter connected to the isolation transformer on the first power device side of the transformer for converting power to and from high frequency AC power; and
    a second isolation converter connected to the isolation transformer on the second power device side of the transformer for converting power to and from high frequency AC power.

3. The assembly of claim 2, wherein the first isolation converter and the second isolation converter each comprise one or more transistors in direct electrical communication with a DC bus having a bulk capacitor.

4. The assembly of claim 2, wherein the first isolation converter and the second isolation converter each comprise an H Bridge.

5. The assembly of claim 1 comprising:
    a first filter electrically connected to the first power deivce and the first power converter to reduce harmonic content; and
    a second filter electrically connected to the second power device and the second power converter configured to reduce harmonic content.

6. The assembly of claim 5, wherein the first filter and the second filter each comprise an inductor-capacitor-inductor configuration.

7. The assembly of claim 1, wherein the first power converter and the second power converter each comprise one or more transistors in direct electrical communication with a DC bus having a bulk capacitor.

8. The assembly of claim 1 further comprising four input/output channels.

9. The assembly of claim 1, wherein the control module comprises:
    a microprocessor coupled to the power inter for strolling the first and second power converter; and
    a user interface for programming and controlling the microprocessor.

10. The assembly of claim 9, wherein the control module comprises at least one of: a wired or wirelesss communication interface.

11. The assembly of claim 1 wherein the first power device is a power grid or battery and the second power device is a motor/generator or battery.

12. The assembly of claim 1 wherein the power interface includes a DC bus and the first power converter is operable to convert AC and DC power to DC power in the first direction and from DC power to AC and DC power in the second direction and the second power converter is operable to convert AC and DC power to DC power in the second direction and from DC power to AC and DC power in the first direction.

13. The assembly of claim 12 wherein the power interface includes an isolation transformer and including a first isolation converter to convert DC power from a DC bus coupled to the first power device to AC power in the first direction and AC power to DC power in the second direction and a second isolation converter to convert AC power to DC power in the first direction and convert DC power to AC power in the second direction.

14. An assembly for bidirectionally supplying power from a first power device to a second power device through a power interface in a first direction and supplying power from the second power device to the first power device in a second direction opposite to the first direction, the power interface comprising:
  a high frequency isolation transformer;
  to the first power converter coupled to the first power device and including a plurality of controllable gates configurable to convert AC and DC ower from the first power device in the first direction,
  a first isolation converter between the first power converter and the isolation transformer configured to convert power to and from high frequency AC power;
  a second power converter coupled to the second power device and including a plurality of controllable gates configurable to convert AC and DC power from the second power device in the second direction; and
  a second isolation converter between the second converter and the isolation transformer to convert power to and from high frequency AC power.

15. The assembly of claim 14, wherein the first power converter and the second power converter each comprise one or more transistors in direct electrical communication with a DC bus having a bulk capacitor.

16. The assembly of claim 14, wherein the first isolation converter and the second isolation converter each comprise one or more transistors in direct electrical communication with a DC bus having a bulk capacitor.

17. The assembly of claim 14, wherein the first isolation converter and the second isolation converter each comprise an H Bridge.

18. The assembly of claim 14 further comprising four input/output channels.

19. The assembly of claim 14 wherein the first power device is a power grid or battery and the second power device is a motor/generator or battery.

* * * * *